US010053567B2

(12) United States Patent
Karmo et al.

(10) Patent No.: US 10,053,567 B2
(45) Date of Patent: Aug. 21, 2018

(54) RECYCLED POLYPROPYLENE COMPOSITIONS AND VEHICULAR COMPONENTS

(71) Applicant: Ford Global Technologies, LLC, Dearborn, MI (US)

(72) Inventors: Talat Karmo, Waterford, MI (US); Paul Kenneth Dellock, Northville, MI (US); Michael Musleh, Canton, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 15/228,713

(22) Filed: Aug. 4, 2016

(65) Prior Publication Data

US 2018/0037728 A1 Feb. 8, 2018

(51) Int. Cl.
  *C08L 23/14* (2006.01)
  *C08K 7/02* (2006.01)
  *C08K 3/04* (2006.01)
  *B60R 13/04* (2006.01)

(52) U.S. Cl.
  CPC ............. *C08L 23/14* (2013.01); *B60R 13/04* (2013.01); *C08K 3/04* (2013.01); *C08K 7/02* (2013.01); *C08L 2205/02* (2013.01); *C08L 2205/025* (2013.01); *C08L 2207/20* (2013.01); *C08L 2666/55* (2013.01); *C08L 2666/72* (2013.01)

(58) Field of Classification Search
  CPC .......... C08L 23/10; C08L 23/12; C08L 23/14; C08L 2205/02; C08L 2205/025; C08L 2205/06; C08L 2207/20; C08L 2666/55; C08L 2666/58; C08L 2666/62; C08L 2666/72; C08K 3/04; C08K 3/34; C08K 7/02
  See application file for complete search history.

(56) References Cited

U.S. PATENT DOCUMENTS

| | | | |
|---|---|---|---|
| 7,041,716 B2 | 5/2006 | Ton-That et al. | |
| 8,568,645 B2 | 10/2013 | Nelson et al. | |
| 8,642,683 B1 * | 2/2014 | Dellock | C08L 23/12 524/13 |
| 8,674,028 B2 * | 3/2014 | Van Riel | C08F 297/08 524/529 |
| 2014/0343197 A1 | 11/2014 | Guha et al. | |
| 2015/0018474 A1 * | 1/2015 | Nakajima | C08L 23/12 524/451 |
| 2015/0045479 A1 | 2/2015 | Yang et al. | |

FOREIGN PATENT DOCUMENTS

| | | |
|---|---|---|
| CN | 103012899 B | 9/2011 |
| EP | 2492305 B1 | 10/2010 |
| EP | 2551299 A1 | 7/2011 |

OTHER PUBLICATIONS

Agunsoye et al.; "Recycled Polypropylene Reinforced Coconut Shell Composite: Surface Treatment Morphological, Mechanical and Thermal Studies;" International Journal of Composite Materials; 2014; pp. 168-178; vol. 4, Issue 3; published online at http://journal.sapub.org/cmaterials; Scientific & Academic Publishing.

Ayrilmis et al.; "Coir Fiber Reinforced Polypropylene Composite Panel for Automotive Interior Applications;" Springer Link; first online Nov. 3, 2011; last accessed Apr. 18, 2016; 5 pages; http://link.springer.com/article/10.1007/s12221-011-0919-1.

Chun et al.; "Characterization and Properties of Recycled Polypropylene/Coconut Shell Powder Composites: Effect of Sodium Dodecyl Sulfate Modification;" pp. 287-294; published online Feb. 5, 2013; last accessed Apr. 18, 2016; vol. 52, Issue 3; http://www.tandfonline.com/doi/abs/10.1080/03602559.2012.749282.

* cited by examiner

*Primary Examiner* — Satya Sastri
(74) *Attorney, Agent, or Firm* — Jason Rogers; Price Heneveld LLP

(57) ABSTRACT

An exterior trim component for a vehicle is provided that includes: 39% to 45% recycled polypropylene copolymer; 27% to 43% recycled polypropylene homopolymer; 0.5% to 2.5% coupling agent; 0.01% to 0.5% flow enhancing agent; 0.5% to 1.5% coconut shell powder; 5% to 10% synthetic filler; and 3% to 17% carbon fiber (by weight). Further, the component is characterized by a flexural modulus of at least 1750 MPa. In certain aspects, the component is further characterized by a coefficient of linear thermal expansion between about $4 \times 10^{-5}$ in/in*° C. and about $0.1 \times 10^{-5}$ in/in*° C., as measured under the ISO 11359-2 protocol.

20 Claims, No Drawings

US 10,053,567 B2

RECYCLED POLYPROPYLENE COMPOSITIONS AND VEHICULAR COMPONENTS

FIELD OF THE INVENTION

The present invention generally relates to recycled polypropylene compositions and vehicular components employing such compositions and, more particularly, to low-talc and talc-free recycled polypropylene compositions for the same.

BACKGROUND OF THE INVENTION

Most current exterior vehicular trim components are fabricated from talc-filled polypropylene and thermoplastic polyolefin ("TPO") materials. Weight reduction and increased use of sustainable, recyclable materials are goals of vehicular manufacturers. Options to integrate recyclable materials into vehicle designs include selecting various recyclable materials with demonstrated mechanical, thermal and other properties that are comparable to the non-recyclable constituents employed in current trim components and parts. Primary options for reducing weight of plastic parts and components in vehicles include reducing the thickness of the parts and components and reducing the density of the materials employed in such parts and components.

While conceiving of trim component designs with reduced part thickness can be relatively straightforward, producing and implementing such designs in vehicles is challenging. In many cases, the strength and stiffness of the materials employed in such designs must be increased to accommodate the reduction in wall thickness. Yet adding high-stiffness constituents to these designs and modifying the materials to improve their strength often results in a significantly less-manufacturing-friendly product, particularly in view of tool wear and the aesthetics of the surfaces of these products.

In general, polymeric materials with recyclable polymeric and non-polymeric constituents have lower flow rates associated with molding operations in comparison to materials employing all or mostly all virgin, non-recycled materials. The melt flow rate of recycled thermoplastic materials is an average of the melt flow rate of its constituents. Given their relatively lower flow rates, polymeric materials with high percentages of recyclable materials can be limited in terms of their integration within vehicular component designs with reduced wall thicknesses.

As noted earlier, most vehicular trim components and parts employ talc-filled polypropylene and talc-filled TPO formulations. Vehicular trim components often employ about 10% to about 40% talc by weight as a filler material. Talc, and other fillers, acts to increase the stiffness and strength of these components. Talc also controls and stabilizes the thermal expansion of these components. Further, talc can act as a nucleating agent for enhancing and accelerating the solidification of these materials during manufacturing within product molds employed to fabricate such vehicular trim components.

Talc as a filler within polymeric vehicular components presents several disadvantages. Talc has a density of about 2.6 g/cm$^3$ and polypropylene has a density of about 0.9 g/cm$^3$. As such, the inclusion of talc in polypropylene vehicular components serves to increase the overall density of the component containing talc as a filler material. Talc also reduces the aesthetics of many vehicular components, particularly at its surfaces. When talc is employed as a filler material in a vehicular polymeric material, its use can reduce the ductility and flow rate of the material during manufacturing.

Other reinforcing filler materials, such as glass, can be used in vehicular trim components with some success in stiffening them with a goal of overall weight reduction. Yet glass has many drawbacks when employed in polymeric vehicular components as a filler material. As glass has a higher density than talc, it can serve to increase the overall weight of a vehicular component in which the talc is replaced with equal parts glass. As glass frit, particles, fiber and the like possess relatively high modulus values, polymeric materials containing glass filler materials can be abrasive. With increased percentages of glass materials, the manufacturing of glass-containing polymeric materials tends to result in shorter tool lifetimes.

Accordingly, there is a need for polypropylene-based compositions suitable for vehicular trim components, and designs of such components, with reduced weight and higher percentages of recyclable materials at current component-neutral cost and performance.

SUMMARY OF THE INVENTION

According to one aspect of the present invention, a recycled polypropylene-based composition is provided that includes:
  39% to 45% recycled polypropylene copolymer;
  27% to 43% recycled polypropylene homopolymer;
  0.5% to 2.5% coupling agent;
  0.01% to 0.5% flow enhancing agent;
  0.5% to 1.5% coconut shell powder;
  5% to 10% synthetic filler; and
  3% to 17% carbon fiber (by weight).

According to another aspect of the present invention, a recycled polypropylene-based composition is provided that includes:
  39% to 45% recycled polypropylene copolymer;
  37% to 43% recycled polypropylene homopolymer;
  0.5% to 2.5% coupling agent;
  0.01% to 0.5% flow enhancing agent;
  0.5% to 1.5% coconut shell powder;
  5% to 10% synthetic filler; and
  1 to 7% talc (by weight).

According to a further aspect of the present invention, an exterior trim component for a vehicle is provided that includes:
  39% to 45% recycled polypropylene copolymer;
  27% to 43% recycled polypropylene homopolymer;
  0.5% to 2.5% coupling agent;
  0.01% to 0.5% flow enhancing agent;
  0.5% to 1.5% coconut shell powder;
  5% to 10% synthetic filler; and
  3% to 17% carbon fiber (by weight). Further, the component is characterized by a flexural modulus of at least 1750 MPa.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the invention may assume various and alternative forms, except where expressly specified to the contrary. Also, the specific compositions, assemblies and components described in the following specification are simply exemplary embodiments of the inventive concepts defined in the appended claims. Hence, specific dimensions, compositions, concentrations and other physical characteristics relating to the embodiments disclosed herein are not to be considered as limiting, unless the claims expressly state otherwise.

Except where expressly indicated, all numerical quantities in the specification and the claims, including amounts and concentrations of specified material(s) and components, are to be understood herein as modified by the word "about" in outlining the broadest scope of the present invention. Further, unless expressly stated otherwise, all stated percentages of a composition, formulation or the like are given in terms of weight percentage herein.

Described in this disclosure are low-talc, and talc-free, polypropylene compositions and materials with recyclable constituents. Similarly, aspects of vehicular components and designs employing these compositions are also detailed in the disclosure. Vehicular components, particularly exterior trim components, according to the disclosure have lower cost and/or weight in comparison to current trim component designs. Further, the vehicular components and compositions of the disclosure are essentially talc-free, or low in talc, in comparison to typical talc-filled vehicular components. In addition, these components and compositions have increased percentages of recyclable materials in comparison to typical vehicular components.

As noted earlier, talc can play an important role in achieving the mechanical and thermal properties of vehicular components, particularly exterior trim components. Yet the use of talc presents many disadvantages, particularly as vehicle manufacturers are increasingly motivated to reduce part weight and increase the percentages of renewable and/or recycled materials.

Two approaches to vehicular component weight reduction are employed in the disclosure. In one approach, the stiffness of vehicular component compositions is maximized to allow the vehicle designer to reduce the wall thickness of the components employing these compositions. As the wall thickness of the component is reduced, the overall weight of the component is similarly reduced. In turn, these weight reductions offer performance benefits to the vehicle containing the component (e.g., increased fuel efficiency). In a second approach, the overall density of the vehicular component composition can be reduced to obtain weight reductions. More particularly, the density of the filler materials employed in these compositions can be reduced with no performance decrease in the component containing these fillers. At the same time, one or both of these approaches is employed in the compositions of the disclosure such that the resulting vehicular component has about the same or lower cost than a comparable component employing a conventional, polymeric vehicular composition (e.g., talc-filled TPO).

Accordingly, the low-talc and talc-free compositions, and vehicular components employing such compositions, of the disclosure utilize these design approaches. Further, these compositions and vehicular components exhibit the same or better mechanical and thermal properties relative to conventional alternatives on a cost-neutral basis. Advantageously, the compositions of the disclosure blend higher-cost reinforcing constituents to obtain mechanical and thermal property performance benefits while offsetting these increased constituent costs by employing lower cost, recyclable and bio-degradable constituents.

As noted in more detail below, the following embodiments and composition design concepts address the above problems and challenges. According to an embodiment of the disclosure, a recycled polypropylene-based composition includes (by weight):
39% to 45% recycled polypropylene copolymer;
27% to 43% recycled polypropylene homopolymer;
0.5% to 2.5% coupling agent;
0.01% to 0.5% flow enhancing agent;
0.5% to 1.5% coconut shell powder;
5% to 10% synthetic filler; and
3% to 17% carbon fiber.

In this embodiment, other constituents may be included at low or trace levels that have no material effect on the mechanical, thermal and other application-related properties. According to some implementations of this embodiment, the composition is talc-free or, in other implementations, substantially talc-free. As used herein, "talc-free" includes polymeric vehicular compositions with less than or equal to 0.05% talc. As used herein, "substantially talc-free" includes polymeric vehicular compositions with less than or equal to 0.25% talc. As also used herein, "low talc" includes polymeric vehicular compositions with talc levels of about 10% or less. In addition, it should be understood that various vehicular components, including exterior vehicular trim components, can be fabricated with the compositions of this embodiment.

According to another embodiment of the disclosure, a recycled polypropylene-based composition includes (by weight):
39% to 45% recycled polypropylene copolymer;
37% to 43% recycled polypropylene homopolymer;
0.5% to 2.5% coupling agent;
0.01% to 0.5% flow enhancing agent;
0.5% to 1.5% coconut shell powder;
5% to 10% synthetic filler; and
1 to 7% talc (by weight).

In this embodiment, other constituents may be included at low or trace levels that have no material effect on the mechanical, thermal and other application-related properties. In addition, various vehicular components, including exterior vehicular trim components, can be fabricated with the compositions of this embodiment.

The various constituents of the foregoing embodiments and other aspects of the disclosure are described in more detail below. As noted in the embodiments above, the compositions of the disclosure include relatively high percentages of polypropylene constituents. In general, the polypropylene employed in these compositions is suitable for injection-molded automotive exterior parts. In some embodiments, the composition includes virgin polypropylene, recycled polypropylene copolymer, recycled polypropylene homopolymer, and/or combinations of these virgin and recycled polypropylene materials. As used herein, a "virgin polypropylene" is a polypropylene material that is employed in the compositions and components of the disclosure, and does not include any substantial recycled material. A suitable virgin polypropylene can comprise a polypropylene copolymer such as LyondellBasell Industries N.V. Pro-fax™ SG899, a high-flow, high-impact polypropylene copolymer resin. For those polypropylene-based compositions of the disclosure that include virgin polypropylene, the material can be incorporated at levels between about 5% to about 90% of the total composition by weight. Preferably, the virgin polypropylene level is minimized to increase the content of recycled materials, including recycled polypropylene materials.

With regard to recycled polypropylene copolymer materials, various recycled polypropylene resins can be employed in the polypropylene-based compositions of the disclosure such as KW Plastics (Troy, Ala.) KW308A recycled polypropylene copolymer. In certain aspects, about 30% to about 60% of the composition by weight is fabricated with recycled polypropylene copolymer materials and resins. In preferred embodiments, about 35% to about 50% of the composition by weight is fabricated with recycled polypropylene copolymer.

In certain recycled polypropylene-based composition embodiments of the disclosure, low density color concentrate additives are included. These additives function to add color such as black, neutral grey and others to the component fabricated from these recycled polypropylene-based compositions. Typically, low density color concentrates are added at 0.5% to 2% of the composition by weight.

In other implementations of the recycled polypropylene-based compositions of the disclosure, heat and ultraviolet (UV) stabilizers are added at a level of 0.5% to 1.5% (in total) to the composition by weight. Examples of such additives include BASF Corp. Irganox® thermal stabilizer, BASF Corp. Tinuvin® light stabilizers, and others, as understood by those with ordinary skill in the art. These additives tend to improve the resistance of components fabricated with these compositions to heat and UV degradation.

A polyolefin elastomer, such as an ethylene-octene copolymer, can also be included in the compositions and components of the disclosure to improve impact resistance. For example, a thermoplastic polyolefin elastomer such as Dow® Chemical Co. Engage™ 8842 can be employed in these embodiments. When polyolefin elastomers are included in the compositions of the disclosure, they are incorporated at levels of about 5% to about 45% of the overall composition by weight.

Some recycled polypropylene-based composition embodiments of the disclosure also include recycled polypropylene homopolymers. In certain aspects, about 20% to about 50% of the composition by weight is fabricated with recycled polypropylene homopolymer materials. In preferred embodiments, about 25% to about 45% of the composition by weight is fabricated with recycled polypropylene homopolymer.

As noted earlier, the use of talc in polypropylene and TPO-based polymeric compositions can be beneficial for a variety of reasons, including that it serves as a nucleation enhancing agent. That is, talc can enhance material solidification during an injection molding process. While bio-based materials can replace talc as a filler in terms of their respective effect on the mechanical and thermal properties of the polymeric composition, they can be limited in terms of their nucleation enhancing capabilities. Similarly, the compatibility of various polar synthetic and bio-based fillers within polypropylene, which is typically non-polar, can create inhomogeneity within the polypropylene-based compositions of the disclosure. Accordingly, at least one of nucleation enhancing agents and coupling agents can be employed in the polymeric vehicular compositions of the disclosure including, but not limited to, dicarboxylic acid-containing materials (i.e., a nucleation enhancing agent), such as a Milliken® Chemical Hyperform® HPN-68L nucleating agents, maleic anhydride (i.e., a coupling agent), such as Eastman™ Chemical Co. G-3003 polymer coupling agents, and others. In particular, Milliken® HPN-68L can act as a catalyst in crystallizing the polypropylene constituents in the composition at higher temperatures to improve production times and facilitating more isotropic shrinkage, both of which can lead to less warpage and higher productivity for entities involved in manufacturing the compositions of the disclosure, including vehicular components employing such compositions. Eastman™ G-3003 acts as coupling agent for balancing the attraction between polar fillers and reinforcements within non-polar polymeric materials. According to an embodiment, about 0.1% to 3% of at least one of coupling agents and nucleation enhancing agents are employed in the polymeric vehicular compositions of the disclosure.

Recognizing that the flow rates of recycled polypropylene constituents within an injection mold, extrusion mold, or other similar manufacturing apparatus are lower than those of virgin polypropylene, certain embodiments of the polymeric vehicular compositions of the disclosure employ appreciable percentages of flow enhancing agents. Flow enhancing agents are used to reduce friction in extrusion and injection mold-related processes to enhance flow of polymeric constituent materials and reduce processing temperatures to increase productivity. Further, flow enhancing agents can be used to reduce injection mold pressures enabling a molder to more easily fill a thin walled-mold for fabricating thinner-wall vehicular components. Advantageously, these flow enhancing agents can be employed in the compositions and components of the disclosure to offset the decreases in flow rates associated with certain fillers that offer reduced weight and improved thermal and mechanical properties, e.g., carbon fibers. According to some embodiments, the flow enhancers are silicone-based and cannot be chromed or painted once incorporated into a final polymeric composition. Other flow enhancers, such as Arbor Plastics Technologies, LLC Qwik Shot® additives and Struktol® Company of America RP 06, RP 11, RP 37 viscosity modifiers, employ additives that are compatible with paint and chrome. According to an embodiment, flow enhancing agents can be incorporated into the polymeric vehicular compositions of the disclosure at about 0.001% to about 1% by weight, and preferably between about 0.01% to about 0.5% by weight of the total composition.

Relative to talc fillers, many bio-based fillers offer reduced density and are significantly more environmentally friendly in terms of disposal and recycling capability. For example, bio-fillers employed in the compositions and vehicular components of the disclosure can include but are not limited to wood fiber, ground coconut shells (e.g., coconut shell powder), and agave fiber. Generally, the density of these bio-based filler materials is less than about 1.2 g/cm$^3$, which is significantly lower than the density of talc, about 2.6 g/cm$^3$. In certain implementations, the density of coconut shell powder employed in polymeric vehicular components is about 2.5 times lower than the density of talc.

In preferred embodiments, the compositions and vehicular components employ ground coconut shells (also referred to herein as "coconut shell powder"), which are lignin-rich in comparison to other bio-based fillers. Further, coconut shell powder is relatively easy to produce as coconuts are a multi-use staple product grown throughout the world. In addition, coconut shells can be easily procured upon removal of the coconut meat and husks. Further, the cost of coconut shell powder is about the same as talc on a per weight basis; however, because the density of coconut shell powder is about 2.5 times lower than talc, coconut shell powder is significantly lower in cost than talc when employed in the vehicular polymeric components of the disclosure.

Ground coconut shell powder has a relatively high modulus and compression strength. Test data from polymeric, exterior vehicle trim compositions containing similar amounts of coconut shell powder as a talc-containing alternatives indicate that coconut shell powder can reinforce these vehicular component compositions with the same or higher levels of stiffness and strength as compared to the talc-containing alternatives. In some implementations of this disclosure, ground coconut powder is employed with an average particle size between about 100 and 200 microns. In addition, coconut shell powder can be obtained from various sources, including coconut powder that can be sourced from Natural Composites, Inc. ("NCI").

While coconut shell powder, and other bio-based materials, provide significant benefits as a substitute filler for talc in polymeric vehicular components, their concentration should be limited in view of their disadvantages. In particular, coconut shell powder, and most other bio-based materials, do not offer the same level of nucleation enhancement as talc can offer. Further, bio-based fillers can exhibit poor heat conduction within polymeric automotive components. As a result, high percentages of bio-based materials, including coconut powder, comparable to the percentages of talc employed in conventional polymeric vehicular components can result in significantly longer molding cycle times and product warpage. Accordingly, aspects of the polymeric vehicular components and compositions of the disclosure can employ bio-based fillers, such as coconut shell powder, between about 0.1% and 5% by weight of the final composition, part or component employing such materials. In preferred implementations, bio-based fillers are employed in these polymeric vehicular components between about 0.5% and about 1.5% by weight. In an exemplary implementation, coconut powder can be employed in a recycled polypropylene-based composition at about 1% by weight.

Other synthetic materials can be employed in the polymeric vehicular components of the disclosure as higher modulus and/or strength substitutes for talc. Synthetically-derived materials including, but not limited to, magnesium oxysulfate, calcium silicate (e.g., calcium inosilicate or calcium metasilicate) and magnesium-based fibers, whiskers and particles can be employed in the polymeric vehicular components of the disclosure. For example, Milliken Chemical Hyperform® HPR-803i can be employed as a synthetic filler with similar stiffness and strength reinforcement capability as chopped glass. Another example synthetic filler that can be employed according to an embodiment is magnesium oxysulfate MOS-HIGE™ whiskers from UBE Materials Industries Ltd./Mitsui Chemical of Japan. Still further, Nyco® Minerals, Inc. NyLite™ synthetic wollastonite needles can also be employed with success in the polymeric vehicular components of the disclosure.

The synthetic fillers employed in the vehicular components of the disclosure preferably are softer than chopped glass and therefore less abrasive to aluminum and steel tools. While these synthetic fillers can improve the mechanical and thermal properties of the polymeric vehicular components of the disclosure relative to talc additions to the same, their use can be limited by their relatively higher cost than talc. Accordingly, aspects of the vehicular polymeric components of the disclosure employ between about 3% and about 12% synthetic filler materials by weight. Preferred implementations of the polymeric compositions and vehicular components of the disclosure include between about 5% and about 10% synthetic filler materials. In another exemplary implementation, about 7% synthetic filler by weight can be employed in the polymeric vehicular compositions and components of the disclosure.

The polymeric vehicular compositions of the disclosure also include appreciable percentages of carbon fibers. As employed in embodiments of these compositions, the carbon fiber is typically in the form of a multi-filament fiber that is formed from very thin strands of carbon fiber twisted together in yarn. Carbon fibers are characterized by strength and stiffness values that far exceed steel, yet weigh about two thirds less. The stiffness gained in a polymeric composition employing carbon fibers depends on the types of carbon fiber employed as a filler, which can depend on the resin and resin ratio for the constituents used to fabricate the carbon fibers. Further carbon fiber factors that influence the mechanical and thermal property enhancements to the polymeric vehicular composition include the fiber form, which can comprise unidirectional fiber, two-dimensional fabrics, three-dimensional fabrics, fiber braids, and chopped fiber forms. Other carbon fiber factors that influence these polymeric vehicular composition properties include the orientation and distribution of the fibers incorporated into these compositions as fillers.

As carbon fiber is incorporated into talc-containing polymeric vehicular compositions as a substitute for talc filler, the stiffness and modulus of the composition, and parts containing such a composition, can be significantly increased. More particularly, these significant stiffness and modulus increases are observed upon equal weight substitutions of talc for carbon fiber. For instance, the Example 2 polypropylene-based formulation outlined in detail below incorporates 6% carbon fiber by weight and exhibits a flexural modulus of about 3500 MPa. In comparison, a polypropylene-based composition containing about 6% talc by weight, as outlined in Example 1 below, exhibits a flexural modulus of 1750 MPa. Accordingly, vehicular parts containing the Example 2 composition with about 6% carbon fiber can be designed with a wall thickness of about 2.5 mm in comparison to a similar part employing the Example 1 composition with an about 6% talc filler reinforcement that can be designed with a wall thickness of about 3 mm.

While the cost of carbon fiber is very high relative to the other constituents of the polymeric vehicular compositions of the disclosure (e.g., about $8 to $10/pound in 2016), the polymeric vehicular compositions can advantageously be made on a cost-neutral basis relative to talc-containing, conventional polymeric vehicular components. As the compositions of the disclosure have higher stiffness and lower density than conventional polymeric vehicular compositions, vehicular components and parts made with the compositions of the disclosure can be made with lower weight and less material, which offsets the relatively higher cost of the carbon fiber reinforcements. Still further, the price of carbon fiber reinforcements appears to be decreasing as recycled carbon fiber offerings (e.g., with nearly the same mechanical and thermal properties as virgin carbon fiber) have begun to reach the marketplace with prices on the order of $5-6/pound. In addition, these recycled carbon fibers can be produced with energy costs of about 85% (e.g., as including energy associated with carbon material reclamation and conversion to fiber) of the relative energy costs used to fabricate virgin carbon fiber As employed in the polymeric vehicular compositions of the disclosure, carbon fiber can be added at levels from about 1% to about 20% by weight. In a preferred embodiment, the carbon fiber is added to the polymeric compositions from about 3% to about 17% by weight. In another preferred embodiment, the carbon fiber levels of the polymeric vehicular composition are maintained at relative percentages that are equivalent to or greater than the percentages of talc in these same compositions. As more carbon fiber is added to the polymeric compositions of the disclosure, the talc levels in the composition can be reduced. Accordingly, the talc-free and substantially talc-free compositions of the disclosure can be realized with the addition of carbon fiber. Similarly, low-talc polymeric compositions can be realized with a blend of talc and carbon fiber reinforcement, in addition to some or all of the foregoing additives and other constituents.

The low-talc and talc-free compositions advantageously employ no talc or limited amounts of talc. Further, these compositions and vehicular components exhibit the same or better mechanical (e.g., flexural modulus) and thermal properties (coefficient of linear thermal expansion) relative to conventional, talc-containing alternatives (e.g., polypropylene with about 23% talc filler) on a cost-neutral basis. Advantageously, the compositions of the disclosure blend higher-cost constituents (e.g., carbon fibers and synthetic fillers) to obtain mechanical and thermal property performance benefits while offsetting these increased constituent costs by employing lower cost, recyclable constituents (e.g., bio-degradable, coconut shell powder and recycled polypropylene materials).

The following example compositions were prepared in an injection molding apparatus to make an exemplary vehicular trim part design with similar dimensions, other than varying wall thicknesses.

COMPARATIVE EXAMPLE

A comparative polypropylene-containing polymeric vehicular composition containing about 23% talc by weight and a balance of virgin polypropylene (designated "Comp. Ex. 1") was used to fabricate an exemplary trim component according to typical injection molding processes understood by those with ordinary skill in the field. Various properties of the Comp. Ex. 1 sample were measured: a density of 1.09 g/cm$^3$; part wall thickness of 3 mm; and a flexural modulus of 2000 MPa (as measured under the ISO 178 test method).

EXAMPLE 1

According to an embodiment of the disclosure, a low talc, recycled polypropylene-based polymeric vehicular composition containing about 6% talc (designated "Ex. 1") was used to fabricate an exemplary trim component comparable in design to the Comp. Ex. 1 part. In particular, the Ex. 1 composition is as follows:
  about 42% recycled polypropylene copolymer;
  about 40% recycled polypropylene homopolymer;
  about 0.5% to 2% low density color concentrate;
  about 0.5% to 1.5% stabilizer;
  about 1.5% coupling agent;
  about 0.03% flow enhancing agent;
  about 1% coconut shell powder;
  about 7% synthetic filler; and
  about 6% talc (by weight).

Various properties of the Ex. 1 sample were measured: a density of 0.99 g/cm$^3$; part wall thickness of 3 mm; and a flexural modulus of 1750 MPa (as measured under the ISO 178 test method). As the Ex. 1 sample has a lower density than the Comp. Ex. 1 sample, the Ex. 1 part reflects about a 10% weight savings over the part made with the Comp. Ex. 1 composition. Further, the relatively high percentages of recycled polypropylene and bio-based filler materials in the Ex. 1 sample result in an estimated cost savings of about 10.8% over parts made with the Comp. Ex. 1 formulation.

EXAMPLE 2

According to an embodiment of the disclosure, a talc-free, recycled polypropylene-based polymeric vehicular composition containing no intentional talc additions and about 6% carbon fiber (designated "Ex. 2") was used to fabricate an exemplary trim component comparable in design to the Comp. Ex. 1 part. In particular, the Ex. 2 composition is as follows:
  about 42% recycled polypropylene copolymer;
  about 40% recycled polypropylene homopolymer;
  about 0.5% to 2% low density color concentrate;
  about 0.5% to 1.5% stabilizer;
  about 1.5% coupling agent;
  about 0.03% flow enhancing agent;
  about 1% coconut shell powder;
  about 7% synthetic filler; and
  about 6% carbon fiber (by weight).

Various properties of the Ex. 2 sample were measured: a density of 0.95 g/cm$^3$; part wall thickness of 2.49 mm; and a flexural modulus of 3500 MPa (as measured under the ISO 178 test method). As the Ex. 2 sample has a lower density and smaller wall thickness than the Comp. Ex. 1 sample, the Ex. 2 part reflects about a 30% weight savings over the part made with the Comp. Ex. 1 formulation. Further, the relatively high percentages of recycled polypropylene and bio-based filler materials in the Ex. 2 sample, and its lower part volume, result in an estimated cost savings of about 7.4% over parts made with the Comp. Ex. 1 formulation, despite the inclusion of relatively high-cost carbon fiber reinforcements.

EXAMPLE 3

According to an embodiment of the disclosure, a talc-free, recycled polypropylene-based polymeric vehicular composition containing no intentional talc additions and about 10% carbon fiber (designated "Ex. 3") was used to fabricate an exemplary trim component comparable in design to the Comp. Ex. 1 part. In particular, the Ex. 3 composition is as follows:
  about 42% recycled polypropylene copolymer;
  about 36% recycled polypropylene homopolymer;
  about 0.5% to 2% low density color concentrate;
  about 0.5% to 1.5% stabilizer;
  about 1.5% coupling agent;
  about 0.03% flow enhancing agent;
  about 1% coconut shell powder;
  about 7% synthetic filler; and
  about 10% carbon fiber (by weight).

Various properties of the Ex. 3 sample were measured: a density of 0.95 g/cm$^3$; part wall thickness of 1.98 mm; and a flexural modulus of 6000 MPa (as measured under the ISO 178 test method). As the Ex. 3 sample has a lower density and wall thickness compared to the Comp. Ex. 1 part, the Ex. 3 part reflects about a 45% weight savings over the part made with the Comp. Ex. 1 formulation. Further, the relatively high percentages of recycled polypropylene and bio-based filler materials in the Ex. 3 sample, and its lower part volume, result in an estimated cost savings of about 13.6% over parts made with the Comp. Ex. 1 formulation, despite the inclusion of relatively high-cost carbon fiber reinforcements.

EXAMPLE 4

According to an embodiment of the disclosure, a talc-free, recycled polypropylene-based polymeric vehicular composition containing no intentional talc additions and about 14% carbon fiber (designated "Ex. 4") was used to fabricate an exemplary trim component comparable in design to the Comp. Ex. 1 part. In particular, the Ex. 4 composition is as follows:

- about 42% recycled polypropylene copolymer;
- about 31% recycled polypropylene homopolymer;
- about 0.5% to 2% low density color concentrate;
- about 0.5% to 1.5% stabilizer;
- about 1.5% coupling agent;
- about 0.03% flow enhancing agent;
- about 1% coconut shell powder;
- about 7% synthetic filler; and
- about 14% carbon fiber (by weight).

Various properties of the Ex. 4 sample were measured: a density of 0.95 g/cm$^3$; part wall thickness of 1.76 mm; and a flexural modulus of 8500 MPa (as measured under the ISO 178 test method). As the Ex. 4 sample has a lower density and wall thickness compared to the Comp. Ex. 1 part, the Ex. 4 part reflects about a 53% weight savings over the part made with the Comp. Ex. 1 formulation. Further, the relatively high percentages of recycled polypropylene and bio-based filler materials in the Ex. 4 sample, and its lower part volume, result in an estimated cost savings of about 16.5% over parts made with the Comp. Ex. 1 formulation, despite the inclusion of relatively high-cost carbon fiber reinforcements.

Variations and modifications can be made to the aforementioned structure without departing from the concepts of the present invention. Such variations and modifications, and other embodiments understood by those with skill in the field within the scope of the disclosure, are intended to be covered by the following claims unless these claims by their language expressly state otherwise.

What is claimed is:

1. A recycled polypropylene-based composition, comprising:
   - 39% to 45% recycled polypropylene copolymer;
   - 27% to 43% recycled polypropylene homopolymer;
   - 0.5% to 2.5% coupling agent;
   - 0.01% to 0.5% flow enhancing agent;
   - 0.5% to 1.5% coconut shell powder;
   - 5% to 10% synthetic filler; and
   - 10% to 17% carbon fiber;
   - wherein, all stated percentages are weight percentages based on the total weight of the composition; and
   - wherein, the composition has a flexural modulus between and including 6000 MPa and 8500 MPa.

2. The composition according to claim 1, wherein the carbon fiber comprises about 10% to 15% carbon fiber.

3. The composition according to claim 1, wherein the coupling agent comprises maleic anhydride.

4. The composition according to claim 1, wherein the synthetic filler comprises at least one of magnesium oxysulfate, calcium silicate, and magnesium-based fibers, whiskers and particles.

5. The composition according to claim 1, wherein the composition is substantially talc-free.

6. The composition according to claim 1, wherein the composition has a density of less than or equal to 1.0 g/cm$^3$.

7. The composition according to claim 1, the composition further characterized by:
   - about 42% recycled polypropylene copolymer;
   - 31% to 40% recycled polypropylene homopolymer;
   - about 1.5% coupling agent;
   - about 0.03% flow enhancing agent;
   - about 1% coconut shell powder;
   - about 7% synthetic filler; and
   - about 10% to 14% carbon fiber.

8. The composition according to claim 1, the composition further characterized by:
   - about 42% recycled polypropylene copolymer;
   - about 36% recycled polypropylene homopolymer;
   - about 0.5% to 2% color concentrate;
   - about 0.5% to 1.5% stabilizer;
   - about 1.5% coupling agent;
   - about 0.03% flow enhancing agent;
   - about 1% coconut shell powder;
   - about 7% synthetic filler; and
   - about 10% carbon fiber.

9. The composition according to claim 1, the composition further characterized by:
   - about 42% recycled polypropylene copolymer;
   - about 31% recycled polypropylene homopolymer;
   - about 0.5% to 2% color concentrate;
   - about 0.5% to 1.5% stabilizer;
   - about 1.5% coupling agent;
   - about 0.03% flow enhancing agent;
   - about 1% coconut shell powder;
   - about 7% synthetic filler; and
   - about 14% carbon fiber.

10. An exterior trim component for a vehicle, comprising:
    - 39% to 45% recycled polypropylene copolymer;
    - 27% to 43% recycled polypropylene homopolymer;
    - 0.5% to 2.5% coupling agent;
    - 0.01% to 0.5% flow enhancing agent;
    - 0.5% to 1.5% coconut shell powder;
    - 5% to 10% synthetic filler; and
    - 10% to 17% carbon fiber,
    - wherein the component is further characterized by a flexural modulus between and including 6000 MPa and 8500 MPa; and
    - wherein, all stated percentages are weight percentages based on the total weight of the composition.

11. The component for a vehicle according to claim 10, wherein the component is further characterized by a coefficient of linear thermal expansion between about $4\times10^{-5}$ in/in*° C. and about $0.1\times10^{-5}$ in/in*° C., as measured under the ISO 11359-2 protocol.

12. The component for a vehicle according to claim 10, wherein the synthetic filler comprises at least one of magnesium oxysulfate, calcium silicate, and magnesium-based fibers, whiskers and particles.

13. The component for a vehicle according to claim 10, wherein the component is substantially talc-free.

14. The component for a vehicle according to claim 10, wherein the component is further characterized by a density of less than or equal to 1.0 g/cm$^3$.

15. The component for a vehicle according to claim 10, the component further characterized by:
    - about 42% recycled polypropylene copolymer;
    - 31% to 40% recycled polypropylene homopolymer;
    - about 1.5% coupling agent;
    - about 0.03% flow enhancing agent;
    - about 1% coconut shell powder;
    - about 7% synthetic filler; and
    - about 10% to 14% carbon fiber.

16. The component for a vehicle according to claim 10, the component further characterized by:
    - about 42% recycled polypropylene copolymer;

about 36% recycled polypropylene homopolymer;
about 0.5% to 2% color concentrate;
about 0.5% to 1.5% stabilizer;
about 1.5% coupling agent;
about 0.03% flow enhancing agent;
about 1% coconut shell powder;
about 7% synthetic filler; and
about 10% carbon fiber.

17. The component for a vehicle according to claim 10, the component further characterized by:
about 42% recycled polypropylene copolymer;
about 31% recycled polypropylene homopolymer;
about 0.5% to 2% color concentrate;
about 0.5% to 1.5% stabilizer;
about 1.5% coupling agent;
about 0.03% flow enhancing agent;
about 1% coconut shell powder;
about 7% synthetic filler; and
about 14% carbon fiber.

18. An injection molded exterior trim component for a vehicle, comprising:
39% to 45% recycled polypropylene copolymer;
27% to 43% recycled polypropylene homopolymer;
0.5% to 2.5% coupling agent;
0.01% to 0.5% flow enhancing agent;
0.5% to 1.5% coconut shell powder;
5% to 10% synthetic filler; and
10% to 17% carbon fiber,
wherein, all stated percentages are weight percentages based on the total weight of the composition; and
wherein, the component is further characterized by a part wall thickness between and including 1.76 mm and 1.98 mm.

19. The injection molded exterior trim component for a vehicle of claim 18, the component further characterized by:
about 42% recycled polypropylene copolymer;
about 36% recycled polypropylene homopolymer;
about 0.5% to 2% color concentrate;
about 0.5% to 1.5% stabilizer;
about 1.5% coupling agent;
about 0.03% flow enhancing agent;
about 1% coconut shell powder;
about 7% synthetic filler; and
about 10% carbon fiber.

20. The injection molded exterior trim component for a vehicle of claim 18, the component further characterized by:
about 42% recycled polypropylene copolymer;
about 31% recycled polypropylene homopolymer;
about 0.5% to 2% color concentrate;
about 0.5% to 1.5% stabilizer;
about 1.5% coupling agent;
about 0.03% flow enhancing agent;
about 1% coconut shell powder;
about 7% synthetic filler; and
about 14% carbon fiber.

* * * * *